United States Patent
Uchiyama et al.

(10) Patent No.: US 6,330,746 B1
(45) Date of Patent: Dec. 18, 2001

(54) METHOD OF DETERMINING THE LENGTH OF ELECTRIC WIRES FOR USE IN CONSTRUCTING A WIRE HARNESS, AND METHOD OF CONSTRUCTING A WIRE HARNESS

(75) Inventors: Kenichi Uchiyama; Kiyokazu Kurihara; Hidetaka Yuri, all of Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/337,486

(22) Filed: Jun. 21, 1999

(30) Foreign Application Priority Data

Jun. 22, 1998 (JP) ................................................ 10-174557

(51) Int. Cl.⁷ .................................................. H01R 43/00
(52) U.S. Cl. .................... 29/872; 29/33; 29/745; 29/755; 29/760; 29/868; 174/72 A
(58) Field of Search .................. 174/72 A; 29/857, 29/865, 872, 33, 745, 755, 760, 868

(56) References Cited

U.S. PATENT DOCUMENTS

| | | | |
|---|---|---|---|
| 1,760,538 | * | 5/1930 | Becker . |
| 3,258,039 | * | 6/1966 | Ewalt . |
| 3,633,096 | * | 1/1972 | Bollman ................................. 324/51 |
| 3,836,415 | * | 9/1974 | Hilderbrandt ........................ 156/296 |
| 3,842,496 | * | 10/1974 | Mercer ................................. 29/624 |
| 3,859,724 | * | 1/1975 | Folkenroth ............................ 29/628 |
| 3,861,015 | * | 1/1975 | Hiiven ............................ 29/203 MW |
| 3,913,202 | * | 10/1975 | Pyle ............................... 29/203 MW |
| 3,930,307 | * | 1/1976 | Schotthoefer ......................... 29/628 |
| 3,946,768 | * | 3/1976 | Fiorentino .......................... 140/92.1 |
| 4,030,029 | * | 6/1977 | Cox ...................................... 324/66 |
| 4,114,014 | * | 9/1978 | Shogo .................................. 219/56 |
| 4,202,722 | * | 5/1980 | Paquin ................................ 156/436 |
| 4,486,058 | | 12/1984 | Takagi et al. ...................... 339/14 R |
| 4,639,819 | | 1/1987 | Kirby ................................. 361/115 |
| 4,711,025 | * | 12/1987 | DeSanto ............................... 29/854 |
| 4,724,612 | * | 2/1988 | Pearson ................................. 29/850 |
| 4,835,858 | * | 6/1989 | Adlon .................................. 29/868 |
| 4,965,929 | * | 10/1990 | Aligue ................................. 29/742 |
| 5,064,384 | | 11/1991 | Weaver ............................... 439/511 |
| 5,153,839 | * | 10/1992 | Cross ................................ 364/486 |
| 5,205,329 | * | 4/1993 | Suzuki .............................. 140/92.1 |
| 5,535,511 | * | 7/1996 | Karasik ................................ 29/872 |
| 5,535,788 | * | 7/1996 | Mori ................................. 140/92.1 |
| 5,543,581 | | 8/1996 | Kurata et al. ...................... 174/52.1 |
| 5,610,447 | | 3/1997 | Nishikawa et al. .................... 307/38 |
| 5,610,454 | * | 3/1997 | Nishikawa .......................... 307/147 |
| 5,614,042 | * | 3/1997 | Nishide ............................... 156/33 |
| 5,680,330 | | 10/1997 | Kunimi et al. ..................... 364/563 |
| 5,807,450 | * | 9/1998 | Takahashi ............................ 156/56 |
| 5,829,129 | * | 11/1998 | Ito ...................................... 29/857 |
| 5,888,324 | * | 3/1999 | Nakamura ............................ 156/55 |
| 5,894,660 | * | 4/1999 | Kobayashi ............................ 29/857 |
| 5,911,450 | * | 6/1999 | Shibata ............................ 29/407.04 |
| 5,940,962 | * | 8/1999 | Shima ................................. 29/825 |
| 5,987,743 | * | 11/1999 | Yui ..................................... 29/850 |
| 6,101,695 | * | 8/2000 | Nakamura ........................... 29/33 M |
| 6,169,934 | * | 1/2001 | Nakayama .......................... 700/213 |

FOREIGN PATENT DOCUMENTS

| | | |
|---|---|---|
| 195 27 751 | 1/1996 | (DE) . |
| 06275149 | * 9/1994 | (JP) . |
| A-8-148900 | 6/1996 | (JP) . |
| 09063369 | * 3/1997 | (JP) . |
| 09182242 | * 7/1997 | (JP) . |
| 09259641 | * 10/1997 | (JP) . |

\* cited by examiner

*Primary Examiner*—Lee Young
*Assistant Examiner*—Paul D. Kim
(74) *Attorney, Agent, or Firm*—Oliff & Berridge, PLC

(57) ABSTRACT

A method for determining lengths of electric wires to be used in constructing a wire harness takes into account curvature of the wires as the wires pass through a jig, an extent to which the ends of each wire extend into a connector housing, and a location of the cavity within the connector housing. Thus, the method helps avoid excess wire length exceeding a given tolerance.

7 Claims, 11 Drawing Sheets

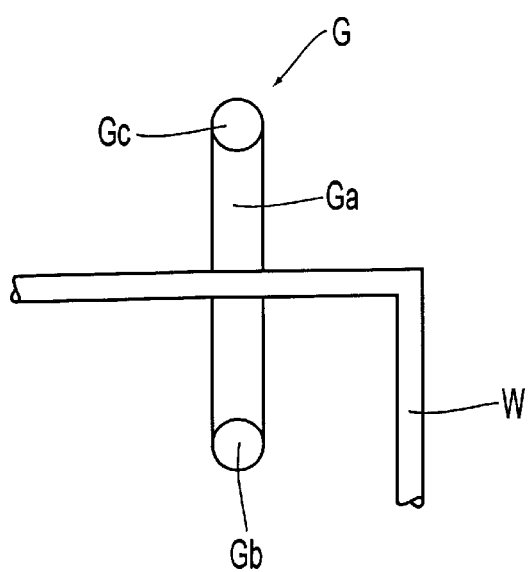 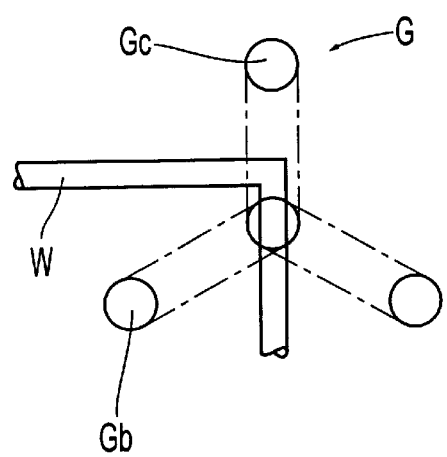
FIG. 3A  FIG. 3B

PROJECTION DRAWING

METHOD OF DETERMINING THE LENGTH OF ELECTRIC WIRES FOR USE IN CONSTRUCTING A WIRE HARNESS, AND METHOD OF CONSTRUCTING A WIRE HARNESS

BACKGROUND OF THE INVENTION

1. Field of Invention

The invention relates to the field of designing and manufacturing a wire harness. Such a wire harness may be used as part of the electrical system of a vehicle, such as an automobile.

More particularly, the invention attempts to determine the appropriate length of each electric wire of the wire harness, without making a large number of experimental trials.

2. Description of Related Art

A wire harness is manufactured by a procedure including the following steps, (1)–(7):

(1) For each new model of vehicle, or for each new version of a pre-existing vehicle, a car maker uses a computer to design a wire harness by a three-dimensional design process. The harness is designed with the requirement that it can be installed in the interior of a vehicle body.

(2) The designed three-dimensional wire harness is then transformed into two-dimensional data. The two-dimensional data further includes data which defines the intended positions of materials for protecting the electric wires, and the interval between branched electric wires of the wire harness.

(3) The car maker sends a wire harness maker a circuit list (that is, a list of circuit components to be installed on a car body) and data defining the connectors to be installed on termination portions of the wire harness.

(4) Based on the data, the wire harness maker calculates the lengths of electric wires for use in constructing the harness (i.e. the wire harness maker calculates the intervals at which a long length of electric wire should be cut in order to supply electric wires for use in the wire harness). The wire harness maker also prepares an assembly drawing, which (as explained below) is used during the assembly of the harness to prevent the electric wires from projecting over the edge of a table on which the wire harness is assembled.

(5) Electric wires are cut based on the calculated lengths, and a terminal is crimped onto an end portion of each electric wire by a terminal-crimping device.

(6) An operator sub-assembles (temporarily binds) the electric wires to one another. In the finished wire harness the ends of some of the wires should be located within a respective connector (the connector having a housing to receive the end), and the operator inserts the end portion of these wires into these respective connector housings during this step.

(7) Finally, the operator correctly places the sub-assembled bundles of electric wires on the table used for assembling the wire harness, combines the sub-assembled bundles with one another, and then binds a plurality of bundles together with adhesive tape. Then, any additional electric components are installed at respective required positions. In this manner, the production of the wire harness is completed.

As part of step (7), as illustrated in FIG. 1, in order to straighten the electric wires an operator draws some of the groups of electric wires by hand in a direction away from their connectors (i.e. away from the ends of the electric wires), and then binds the straightened parts of the electric wires together with adhesive tape (T). The reason why the operator binds the electric wires starting at the end nearest the connectors is to ensure that the position of the end of each wire agrees with the length indicated on the assembly drawing, at least to within a certain tolerance. If instead the operator were to bind the electric wires starting at an inner part of the wire harness and work towards the connectors, then the electric wire would be much too long at the connector (i.e. the position of the end would differ from the position indicated on the assembly drawing by more than the tolerance).

Because the operator binds the wires by starting at the outside of the harness and gradually working towards the internal parts of the harness, any excess in the length of a wire causes the wire to flex outwards at an internal branch point of the wire harness.

More specifically, the wires are retained in position in the wire harness by jigs. Among the jigs are jigs having two fingers for retaining wires ("U-shaped jigs"), jigs having three fingers for retaining wires ("Y-shaped jigs"), and jigs having four fingers for retaining wires ("X-shaped jigs"). The fingers extend perpendicularly to the plane of the wire harness assembly platform. As the operator gradually winds the tape around the group of the electric wires starting at the connectors, the operator reaches a point in the wire harness at which a U-shaped, X-shaped or Y-shaped jig (G) supports the group of the electric wires. If the length of the group of electric wires exceeds a tolerance, the excess bulges out between jigs G-1 and G-2, as shown in FIG. 2A.

As shown in FIGS. 2A, 2B, and 2C, the excess electric wire is flexed or coiled before the adhesive tape T is wound on it. At portions of the wire harness at which there are many bundled electric wires, it is necessary to do this many times.

Each such processing step increases the time and labor required to produce the wire harness.

Furthermore, at portions of the wire harness at which many electric wires have been flexed or coiled in this way, the outer diameter of the harness becomes large, and thus the electric wires may interfere with any other nearby components. Therefore, the electric wires should not all be flexed or coiled at the same place. A skilled operator is required to perform such work. Furthermore, because the electric wires are longer than is required, the cost of the resulting wire harness is unnecessarily high, and vehicles on which they are mounted are unnecessarily heavy.

In order to avoid bulging of the electric wires, wire harness manufacturers construct the wire harnesses several times on an experimental basis, to determine an appropriate length of each electric wire. This operation is called "wire length tuning" and is performed two to three times, which takes a considerable time. Thus, it would be advantageous to eliminate the need for the wire length tuning, or at least reduce the number of times wire length tuning must be performed.

Accordingly, the inventors have researched into the procedure for designing wire harnesses by experiment, and found that the excess length of an electric wire arises when the electric wire passes in a curve through a jig. That is, as shown in FIGS. 3A and 3B, the length of an electric wire has been calculated by supposing that in passing through the jig, the electric wire lies in the plane of a wire harness, and, if for instance the jig G includes two fingers Gb and Gc upstanding from a wire holding portion Ga, that the wire passes through the center of the interval between fingers Gb and Gc. It is also assumed that the electric wire bends by 90° at the center of the interval between the fingers Gb and Gc. These assumptions are applied to calculate the length of each electric wire, and as a result, the calculated length of the electric wire is too long, due to the fact that the wire actually curves and is displaced from the center of the interval between the fingers. The over-calculation is great if the jig is large, i.e. when the interval between the fingers Gb and Gc is large, or if the electric wire passes through many jigs.

SUMMARY OF THE INVENTION

The invention attempts to address the above problem. It is therefore an object of the invention to provide a method of determining the length of electric wires to be used in constructing an electric harness in which excess wire length is avoided. The invention thus aims to remove the necessity for wire length tuning, or at least make it unnecessary to perform wire length tuning more than once.

Accordingly, in a first aspect the invention provides a method of determining appropriate lengths of a plurality of wires to be used to construct a wire harness by a manufacturing process. The process includes:

(1) cutting electric wires of the appropriate lengths,
(2) temporarily binding groups of said electric wires together,
(3) passing the groups through at least one jig on a wire harness assembly platform,
(4) binding the groups to each other by winding adhesive tape around them, and
(5) inserting the ends of a plurality of the wires into respective cavities in connector housings.

The method also estimates an approximate length for each wire, and each approximate length is based on a respective path through the wire harness that passes through each jig. The method further includes determining each appropriate length by correcting the respective approximate length based on (a) bending of the wire as it passes through the at least one jig; and in the case of each wire that is intended to be inserted into a cavity in a connector housing, (b) the extent to which the wire is intended to extend into the connector housing, and (c) a distance of the cavity into which the wire is intended to be inserted from a position of the connector housing which is central with respect to the wire harness.

The invention thus preferably takes into account the fact that approximate lengths indicated on a design drawing may not be optimal.

To explain correction (c), when an electric wire is connected with a multi-electrode connector housing, the length of electric wire which is intended to be inserted into a cavity at a widthwise end of the connector housing should be different from that of an electric wire to be inserted into a cavity at the widthwise center of the connector housing. Thus, based on the difference in optimal length between two such electric wires, the present invention is intended to correct the length accordingly.

The method thus attempts to correct the length of each electric wire to an optimum value to prevent each wire from being longer or shorter than a tolerance, thereby to eliminate the need for a wire length tuning experiment, or at least to allow the wire length tuning experiment to be carried out only once.

Preferably, correction (a) takes into account the difference between a wire path through the center of the jig in the plane of the wire harness and a wire path in which the wire curves in the plane of the wire harness and touches the inner side of a portion of the jig.

More specifically, correction (a) may be by a value $\Delta L$ determined by the following equation, $$\Delta L = \frac{1}{2}\sum_{m=1}^{k} W_{2,m} + \sum_{p=1}^{h} W_{3,p} + \sum_{n=1}^{i} W_{4,n} - \frac{1}{4} B\, coe(r) 2\pi$$

where k is the number of 2-finger jigs through which the wire passes, h is the number of 3-finger jigs through which the wire passes, i is the number of 4-finger jigs through which the wire passes, m, n and p are integer variables, $W_{2,m}$ is the distance between the two fingers of the m-th 2-finger jig, $W_{3,p}$ is the distance between two fingers of the p-th 3 finger jig, $W_{4,n}$ is the distance between the two fingers of n-th 4finger jig, r is the radius of the wire, coe(r) is the minimum radius of curvature of the wire depending on the radius r, and B is the total number of turns made by the wire due to the jigs.

The minimum radius of curvature, coe(r), of a wire of a certain diameter (i.e. 2r) is a value obtained by experiment from wiring electric wires on a wire harness-assembling table, and is shown for example, in Table 1 below for wires having certain conductor sizes:

TABLE 1

| Size (mm$^2$) | Minimum radius, coe (mm) |
| --- | --- |
| 0.30 | 2.983 |
| 0.50 | 3.297 |
| 0.85 | 3.768 |
| 1.25 | 3.925 |
| 2.00 | 4.239 |
| 3.00 | 5.024 |

The correction (a), to take into account the length of the end portion of an electric wire which is inside a cavity in a connector housing, is made by subtracting the intended distance between the front end of the connector housing and the front end of the electric wire from the approximate length indicated on the drawing, i.e. the length between the rear end of the electric wire and the front end of the connector housing.

As shown in FIG. 4, the length indicated on the drawing is calculated for each circuit, based on the length of an electric wire (shown by a bold line in FIG. 4) between connector housings (shown by (8) and (13) in FIG. 4) located at the two ends of the wire.

As shown in FIG. 5, a terminal T provided on the end of the electric wire is not inserted so far into the housing that it extends as far as the front end of the connector housing, and the electric wire does not extend as far as the front end of the terminal T. The electric wire terminates at a position a little rearward from the front end of each connector housing. Thus, an approximate length of the electric wire determined by supposing that the end of the wire is positioned at the front end of each of the connector housings is excessive by $T_1$. Thus, an appropriate length of the electric wire may be determined by subtracting $T_1$ from the approximate length (i.e. the length up to the front end of each connector housing).

However, the wire harness is required to be so manufactured that the distance between a predetermined position thereof and the front end of each connector housing falls within a length tolerance of +10 mm, −0 mm with respect to the front end of the connector housing. Therefore, the wire harness is manufactured by adding ½ of the length tolerance (i.e. 5 mm, refeffed to here as "$D_1$") to the distance between the predetermined position of the wire harness and the front end of the connector housing.

Accordingly, correction (a) preferably corrects the length to be equal to the approximate length (i.e. the length assuming that the end portion of the electric wire is inserted into the connector housing up to the front end of the connector housing) corrected by a correction of ($-T_1+5$ mm).

The correction (c) to take into account an end portion of an electric wire which is to be inserted into a cavity of the connector housing positioned outward from the outer diameter (periphery) of the wire harness is made by adding a predetermined correction value to the appropriate length of an electric wire positioned at the sectional center of the wire harness.

The correction value, $L_1$, is given by $$L_1 = \sqrt{(X-X_1)^2 + (Y-Y_1)^2}$$

where

X and Y are the coordinates of a centre of the wire harness measured along respective x- and y- coordinate axes which are perpendicular to the extension direction and to each other, and $X_1$ and $Y_1$ are the coordinates of the centre of the cavity measured along said respective x- and y- coordinate axes.

That is, as shown in FIG. 6, a respective terminal of each of a plurality of electric wires W, bound with an adhesive tape at a convergent point R located in front of the connector housing, is inserted into a respective cavity of the connector housing. The binding position corresponds to approximately the center of the connector housing. Thus, it is necessary to make an electric wire to be inserted into a cavity at the outer side of the connector housing longer than an electric wire to be inserted into a cavity at the center thereof. It is unnecessary to make this correction when the distance of the cavity from the centre point of the connector housing is smaller than the radius of the wire harness.

As described above, based on the length indicated on the drawing, corrections are made based on: the length of the portion of each of the electric wires which passes curvedly through a jig; the length of the portion of each of the electric wires which is inserted into a cavity of a connector housing; and the length of the termination portion of each of the electric wires which is inserted into a cavity of the connector housing positioned outward from the outer diameter of the wire harness. Thus, compared with the wire length tuning method of cutting electric wires in accordance with the approximate length indicated on a drawing, the method of the invention reduces the excess amount of each electric wire greatly. Thus, it is not necessary to repeatedly make up wire harnesses on an experimental basis, and it is possible to make wire harnesses on an experimental basis in a short period of time.

In a second aspect, the invention provides a method of determining the appropriate lengths of a plurality of wires to be used to construct a wire harness by a manufacturing process including:

(1) cutting electric wires of said appropriate lengths,
(2) temporarily binding groups of electric wires together,
(3) passing the groups through one or more jigs on a wire harness assembly platform,
(4) binding the groups to each other by winding adhesive tape around them, and
(5) inserting the ends of a plurality of the wires into respective cavities in connector housings, the method comprising:

determining an approximate length of each electric wire based on intended wire paths through the wire harness which pass through the jigs; and determining each appropriate length by correcting the respective approximate length to take into account (a) the bending of the wire as it passes through a jig, and in the case of each wire which is intended to be inserted into a cavity in a connector housing, (b) the extent to which the wire is intended to extend into the connector housing, and (c) a distance of the cavity into which the wire is intended to be inserted from a position of the connector housing which is central with respect to the wire harness.

In a third aspect, the invention provides a method of constructing a wire harness comprising a plurality of wires which pass through one or more jigs on a wire harness assembly platform, at least one end of a plurality of said wires being located within a respective cavity in a respective connector housing, the method comprising:

(1) determining an approximate length of each said wire based on an intended path of the respective wire through the wire harness;
(2) determining an appropriate length of each said wire by correcting the respective approximate length to take into account
   (a) the bending of the wire as it passes through a jig, and in the case of each wire which is intended to be inserted into a cavity in a connector housing,
   (b) the extent to which the wire is intended to extend into the connector housing, and
   (c) a distance of the cavity into which the wire is intended to be inserted from a position of the connector housing which is central with respect to the wire harness;
(3) producing electric wires of said respective appropriate lengths,
(4) temporarily binding groups of electric wires together,
(5) passing the groups through said jigs on a wire harness assembly platform,
(6) binding the groups to each other by winding adhesive tape around them, and
(7) for each wire which has an end which is intended to be inserted into a cavity in a respective connector housing, inserting the end of the wire into said respective cavity in said respective connector housing.

These and other aspects will be described in or apparent from the fully detailed description of preferred embodiments.

BRIEF DESCRIPTION OF THE DRAWINGS

Embodiments of the invention will now be described, for the sake of example only, with reference to the following drawings, in which:

FIG. 3A and FIG. 3B are views illustrating a method of determining the approximate length of an electric wire which passes in a curve through a jig.

DETAILED DESCRIPTION OF PREFERRED EMBODIMENTS

Embodiments of the invention will be described in detail below.

Figure 7:
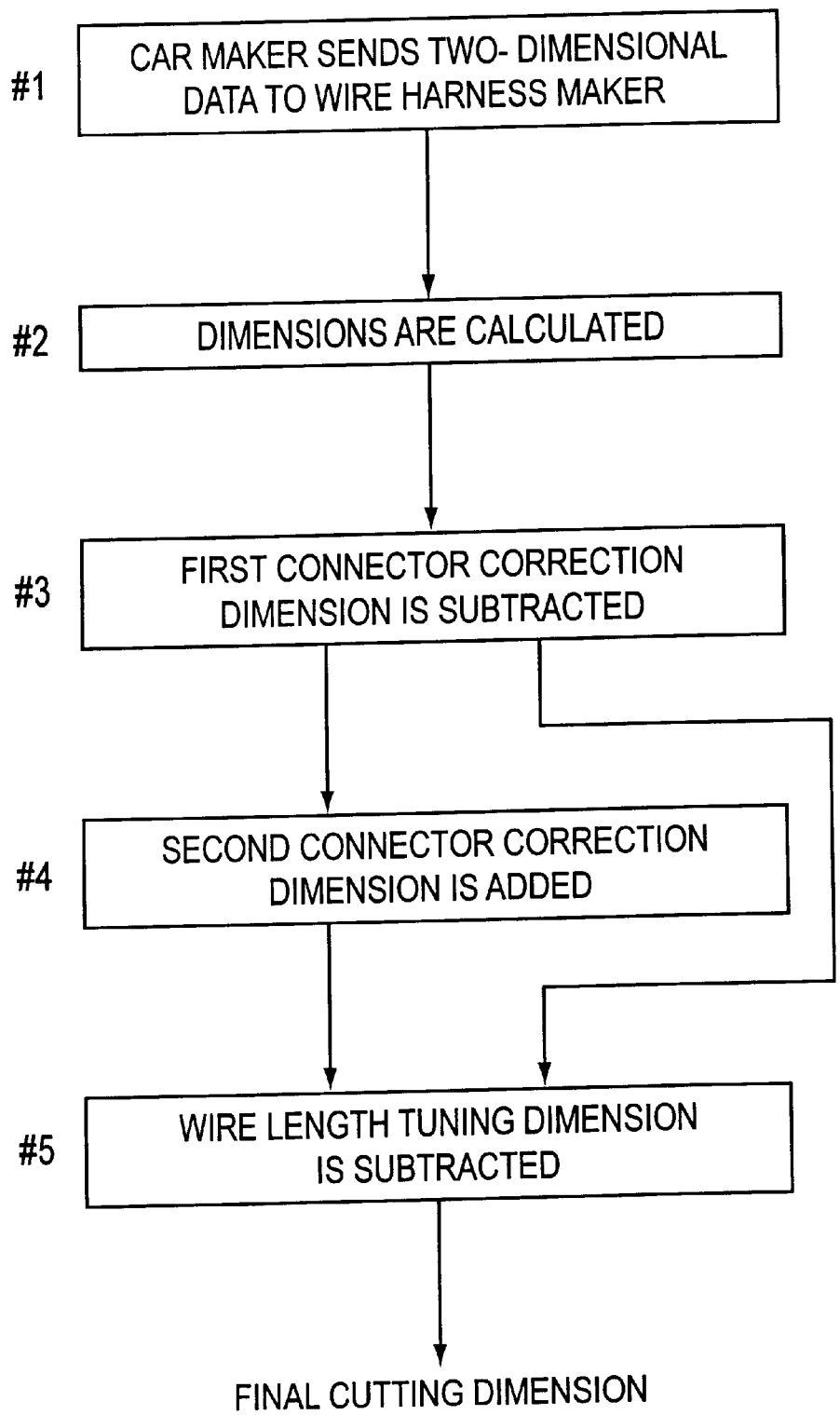
FIG. 7 is a view showing a procedure of determining the appropriate lengths of electric wires according to the invention.

The cutting length of electric wires of a wire harness is set in a procedure from step #1 to step #5 shown in FIG. 7.

At step #1, a car maker sends two-dimensional data of a wire harness for each circuit to a wire harness maker. The car maker has produced this two-dimensional data by transforming three-dimensional data to two-dimensional data. The two-dimensional data includes positions of component parts to be installed on the wire harness, intervals between branching electric wires, and the like.

Figure 4:
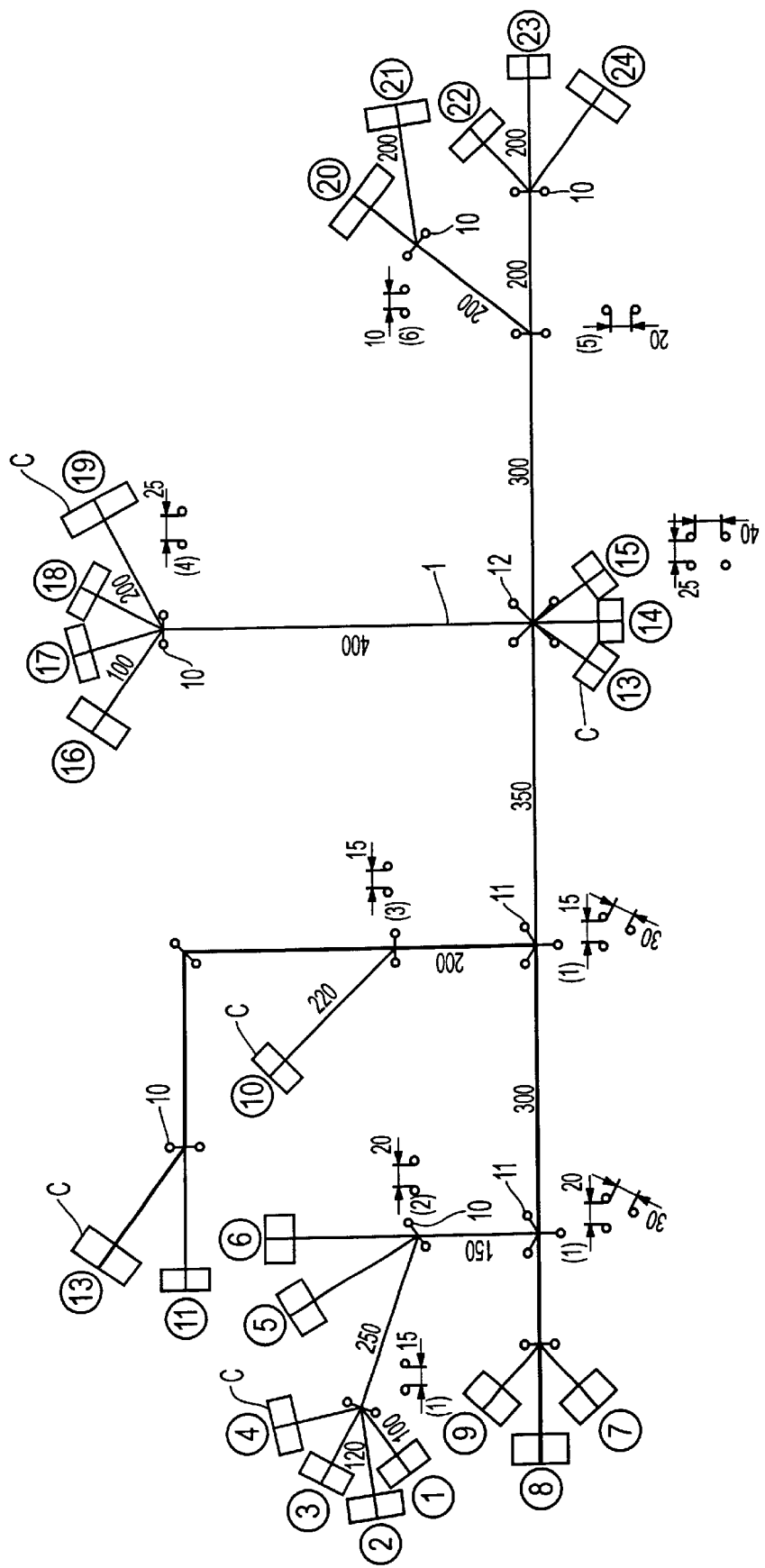
FIG. 4 is a view showing approximate lengths indicated on a drawing.

At step #2, the wire harness maker calculates lengths to be indicated on a design drawing, as shown in FIG. 4. In the lengths indicated on the design drawing, at the portion of connection between an electric wire and a connector (C), the cutting length of the electric wire is set to the length up to the front end of each connector housing. As described previously, the required length of the electric wire is calculated, supposing that an electric wire 1 positioned at the center of the wire harness in section passes through the center of the distance between fingers of an electric wire-holding portion of each of jigs 10, 11, and 12, the electric wire there bending by 90°. In this case, the shape (U-shaped, Y-shaped, and X-shaped) of the jigs 10, 11, and 12 is not considered.

At step #3, a first correction length of the electric wire inside the connector housing is subtracted from the length indicated on the design drawing.

Figure 5:
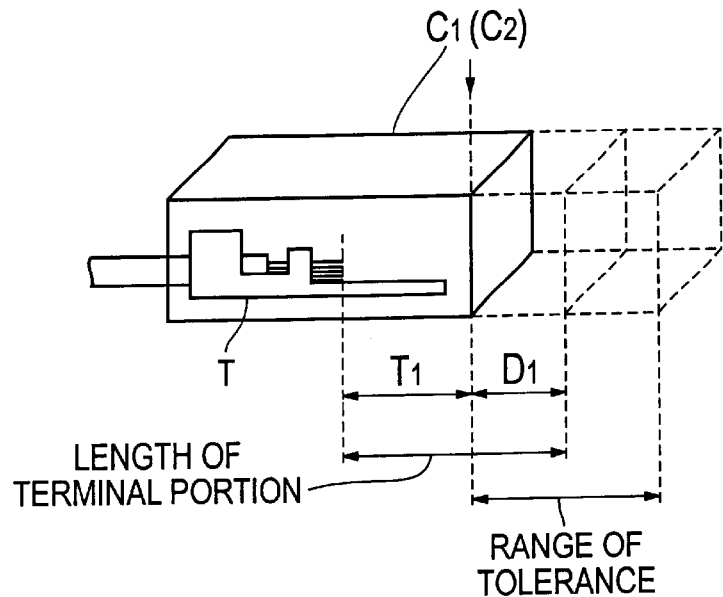
FIG. 5 is a view showing a first way of correcting the length of an electric wire inserted into a connector housing.

As described previously with reference to FIG. 5, in correcting the length of the electric wire inside the connector housing, the length T=1 mm between the front end of each connector housing and the front end of a terminal inside the connector housing is subtracted from the length indicated on the drawing, and a length tolerance (=5 mm) with respect to the front end of the connector housing is added to the length indicated on the drawing.

That is, regarding the electric wire whose termination is connected with the connector housing, the length of the electric wire is determined by subtracting the length T=1 mm from the length indicated on the drawing and adding 5 mm thereto.

At step #4, a second correction length is added to the length indicated on the drawing.

Figure 6:
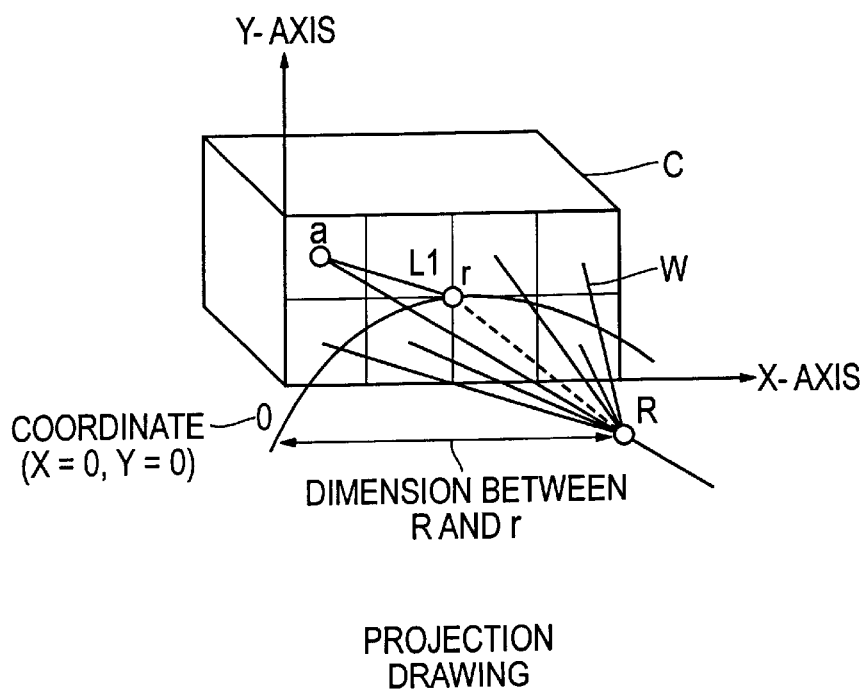
FIG. 6 is a view showing a second way of correcting the length of an electric wire inserted into a connector housing.

As described previously with reference to FIG. 6, the length of the termination portion of the electric wire which is to be inserted into a cavity of the connector housing positioned outward from the outer diameter (periphery) of the wire harness, is corrected by adding a predetermined length to the length of the electric wire positioned at the center of the wire harness in section.

At step #5, a wire tuning length is subtracted from the length determined by making corrections of the length indicated on the drawing at steps #3 and #4.

Figure 8A:
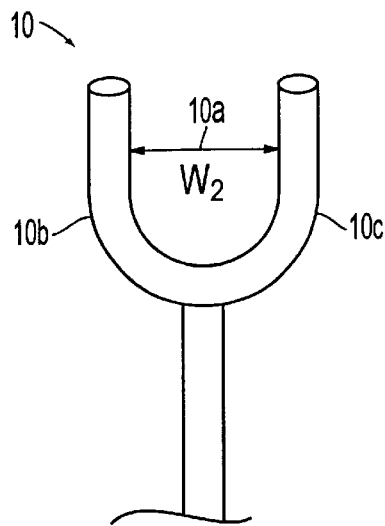
FIGS. 8A and 8B are views showing how the length of an electric wire is determined by the method of an embodiment of the invention if the wire passes through a U-shaped jig.
Figure 8B:
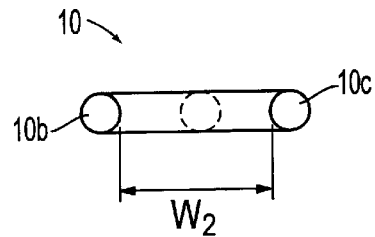
Figure 9:
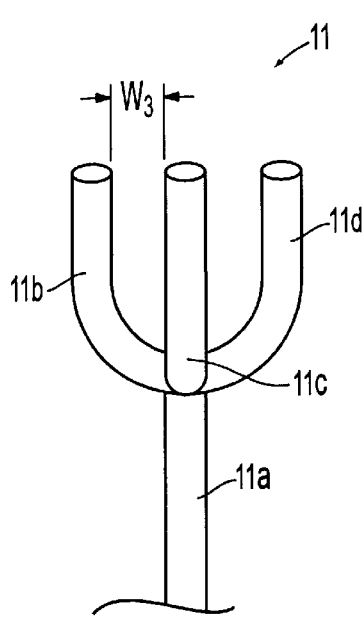
FIG. 9 is a view showing how the length of an electric wire which passes through a Y-shaped jig, is determined by an embodiment of the invention.
Figure 10:
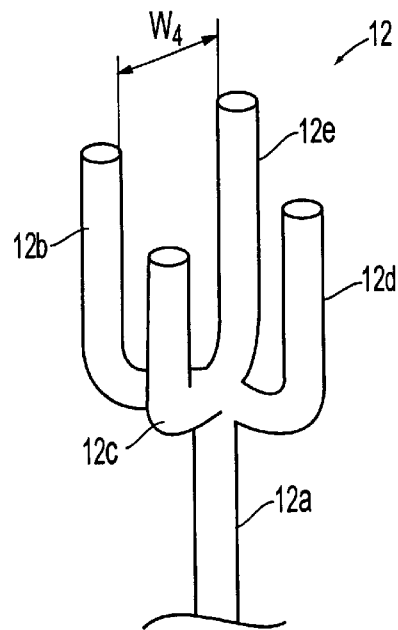
FIG. 10 is a view showing how the length of an electric wire which passes through an X-shaped jig, is determined by an embodiment of the invention.
Figure 11A:
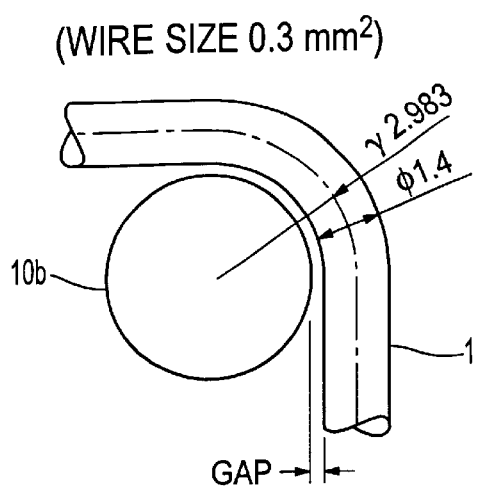
FIGS. 11A, 11B, 11C, and 11D are views each showing a minimum radius of curvature of an electric wire depending on the diameter of the electric wire.
Figure 11B:
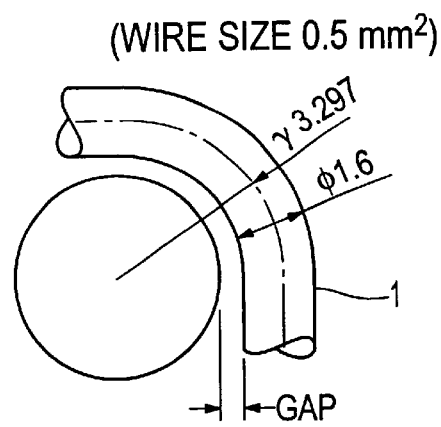
Figure 11C:
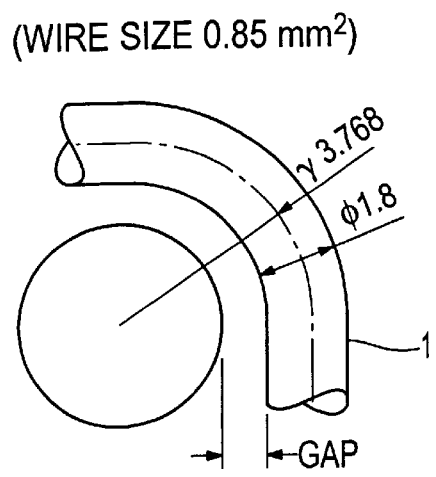
Figure 11D:
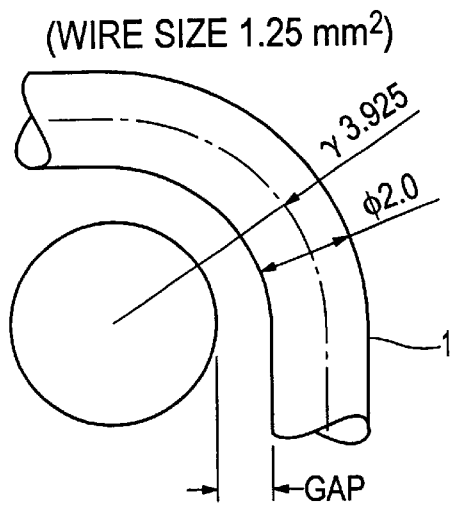

This wire tuning correction is made in the case of an electric wire which passes curvedly through a jig. As described above, in the length indicated on the drawing determined at step #2, the required length of the electric wire is calculated, supposing that the electric wire is positioned at the center of the wire harness in section, and passes through the center of the distance $W_2$ between fingers 10b and 10c of an electric wire-holding portion 10a of a jig 10 (11, 12), curving at that point by 90° (see FIG. 8A).

The above method is applied to determine the cutting length of all electric wires. Thus, there is correction for the dislocation of the electric wire within the jig towards the inner peripheral side curving direction, and that the electric wire curves at an angle less than 90°. Thus, as described previously, correction is made based on the equation shown below:

$$\Delta L = \frac{1}{2}\sum_{m=1}^{k} W_{2,m} + \sum_{p=1}^{h} W_{3,p} + \sum_{n=1}^{i} W_{4,n} - \frac{1}{4} B\, coe(r) 2\pi$$

where
  k is the number of 2-finger jigs through which the wire passes,
  h is the number of 3-finger jigs through which the wire passes,
  i is the number of 4-finger jigs through which the wire passes,
  m, n and p are integer variables,
  $W_{2,m}$ is the distance between the two fingers of the m-th 2-finger jig,
  $W_{3,p}$ is the distance between two fingers of the p-th 3 finger jig,
  $W_{4,n}$ is the distance between the two fingers of n-th 4-finger jig,
  r is the radius of the wire,
  coe(r) is the minimum radius of curvature of the wire depending on the radius r, and
  B is the total number of turns made by the wire due to the jigs.

When the electric wire 1 passes linearly through the X-shaped jig 12, the correction is not made. The correction is made only in the case of an electric wire which curves at the jig 12.

FIGS. 8A through 10 show the length $W_2$ between fingers of an electric wire-holding portion of the U-shaped jig 10, the length $W_4$ between fingers of an electric wire-holding portion of the X-shaped jig 11, and the length $W_3$ between fingers of an electric wire-holding portion of the Y-shaped jig.

Referring to FIGS. 8A through 10, reference symbol $W_2$ denotes the width between fingers 10b and 10c of the U-shaped jig 10 surrounding an electric wire-accommodating portion 10a. In the Y-shaped jig 11 shown in FIG. 9, three fingers 11b, 11c, and 11d project upward from the upper end of a main shaft 11a installed on a wire harness-assembling working table at intervals of 120°. The space between the fingers 11b and 11c, between the fingers 11c and 11d, and between the fingers 11d and 11b serve as an electric wire-accommodating portion, respectively. In the Y-shaped jig 11, the length between the fingers 11b and 11c, between the fingers 11c and 11d, and between the fingers 11d and 11b sandwiching each electric wire-accommodating portion, is $W_3$. In the X-shaped jig 12 shown in FIG. 10, four fingers 12b, 12c, 12d, and 12e project upward from the upper end of a main shaft 12a installed on a wire harness-assembling working table at intervals of 90°. The space between the fingers 12b and 12c, between the fingers 12c and 12d, between the fingers 12d and 12e, and between the fingers 12e and 12b serve as an electric wire accommodating portion, respectively. In the X-shaped jig 12, the length between the fingers 12b and 12c, between the fingers 12c and 12d, between the fingers 12d and 12b, and between the fingers 12e and 12b sandwiching each electric wire-accommodating portion are $W_4$, respectively.

Thus, for example, when one electric wire passes through the U-shaped jig 10 three times, passes through the Y-shaped jig 11 two times, and passes through the X-shaped jig 12 two times, first, the value of the following formula is determined:

$$\tfrac{1}{2}W_2 3 + W_3 2 + W_4 2$$

¼ of the circumference determined from a minimum radius of a curved electric wire is subtracted from the value determined by the formula shown above. That is, as shown in FIGS. 11A–11D, supposing that the diameter of the inner peripheral-side finger 10b of the jig 10 (11, 12) is 4 mm, the minimum radii of curvature (referred to as γ in FIGS. 11A–11D) of the curved electric wires 1 vary according to the thickness (diameter) thereof. Table 1 shows this variation with diameters of the curved electric wires 1. FIGS. 11A–11D show the values in mm of parameter φ, which is the diameter of the electric wire in combination with an external insulating layer which encircles the wire.

A value determined by subtracting a wire length tuning length ΔL from the electric wire-cutting length determined at step #4 is the final cutting length obtained by the correction.

In the case of the wire harness shown in FIG. 4, the wire length tuning length ΔL of each wire is as shown in table 2. In table 2, the electric wires of circuits denoted by numerals 1~3 pass through three U-shaped jigs whose $W_2$ values are 15 mm, 20 mm, and 25 mm, respectively; pass once through a Y-shaped jig whose $W_3$ value is 20 mm; and pass once through an X-shaped jig whose $W_4$ value is 25 mm. The electric wires curve when they are passed through each jig.

TABLE 2

| Circuit Number | Connector number End A | Connector number End B | Wire size (mm²) | Length shown on diagram (mm) | Length after connector correction (mm) | Length after tuning (mm) | Tuning length (mm) |
|---|---|---|---|---|---|---|---|
| 1 | 1 | 16 | 0.85 | 1730 | 1720 | 1674.6 | 45.4 |
| 2 | 1 | 16 | 0.30 | 1730 | 1720 | 1668.5 | 51.5 |
| 3 | 1 | 16 | 0.50 | 1730 | 1720 | 1670.9 | 49.1 |
| 4 | 1 | 19 | 0.50 | 1750 | 1740 | 1690.9 | 49.1 |
| 5 | 1 | 19 | 0.50 | 1750 | 1740 | 1690.9 | 49.1 |
| 6 | 2 | 10 | 1.25 | 1220 | 1210 | 1180.9 | 29.1 |
| 7 | 2 | 10 | 0.5 | 1220 | 1210 | 1175.9 | 34.1 |
| 8 | 2 | 23 | 0.85 | 1850 | 1840 | 1820.3 | 19.7 |
| ↓ | ↓ | ↓ | ↓ | ↓ | ↓ | ↓ | ↓ |
| 91 | 19 | 21 | 0.50 | 1300 | 1290 | 1258.3 | 31.7 |
| 92 | 19 | 21 | 0.85 | 1300 | 1290 | 1261.2 | 28.8 |

The electric wires of the circuits denoted by 6 and 7 pass through three U-shaped jigs whose $W_2$ values are 15 mm, 20 mm, and 15 mm respectively, and pass once through two Y-shaped jigs whose $W_3$ values are 20 mm and 15 mm respectively. The electric wires curve when they are passed through each jig.

Figure 1:
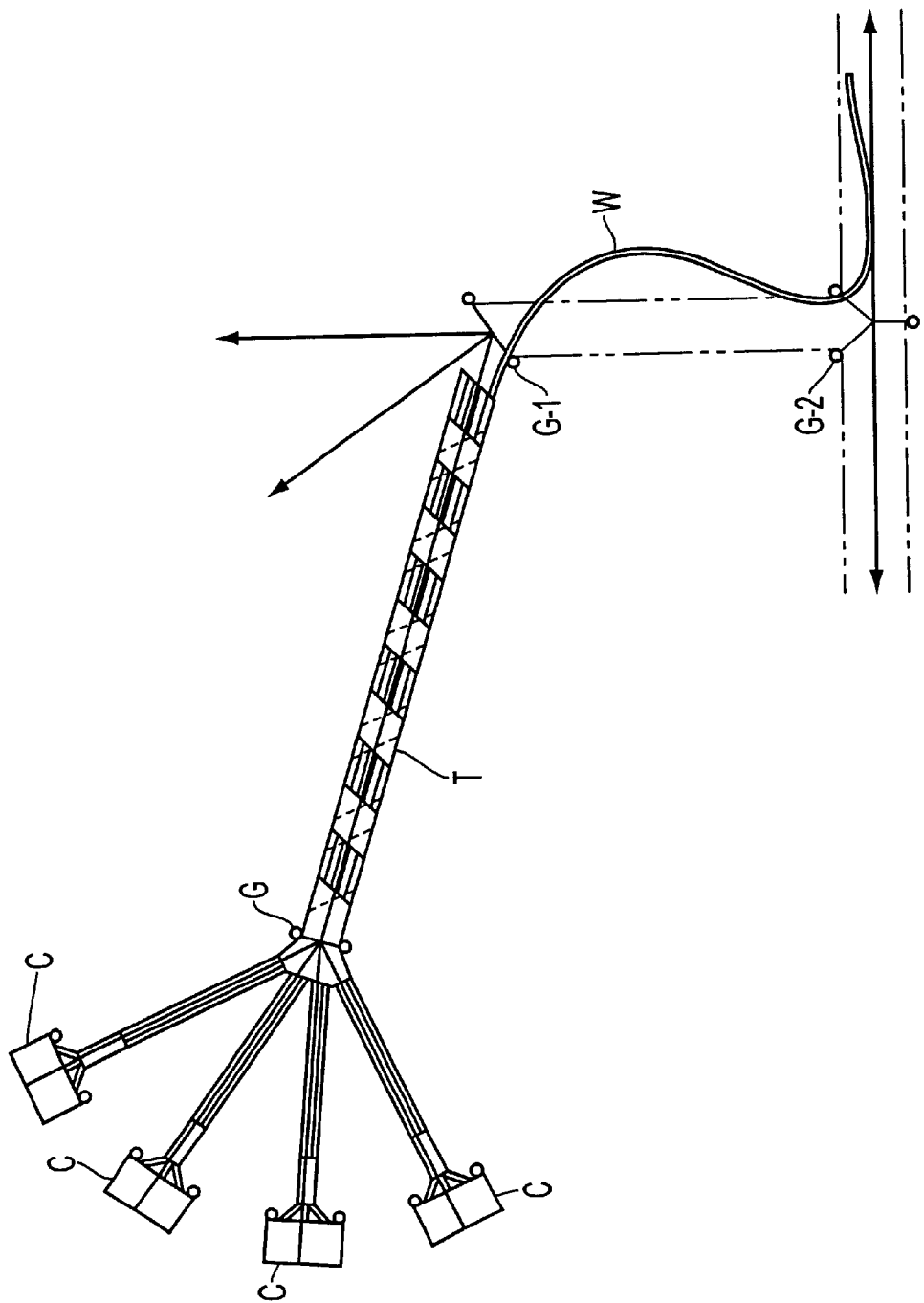
FIG. 1 is a schematic view showing the problem of a method of cutting electric wires.
Figure 2A:
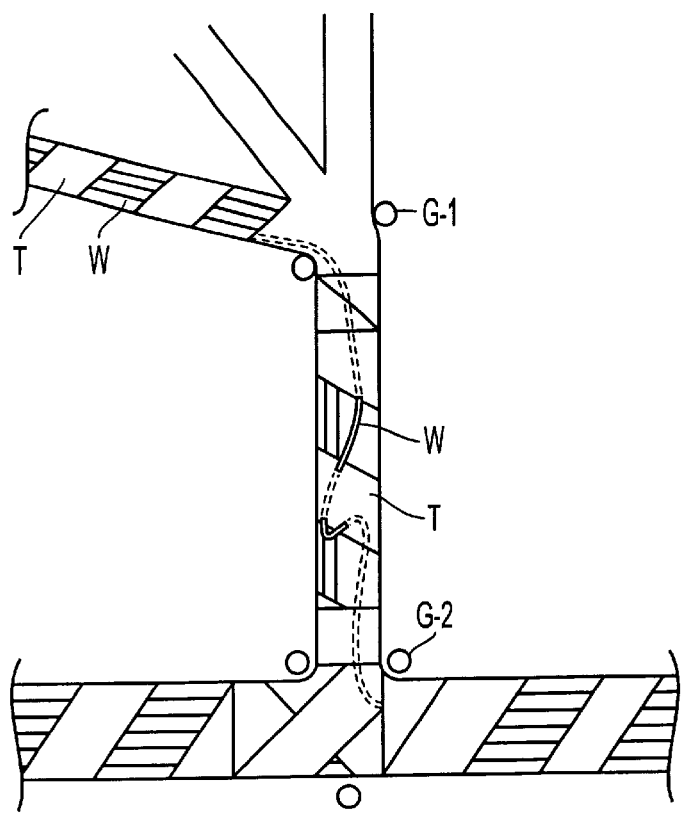
FIGS. 2A, 2B, and 2C are schematic views each showing a method of dealing with a surplus of electric wire.
Figure 2B:
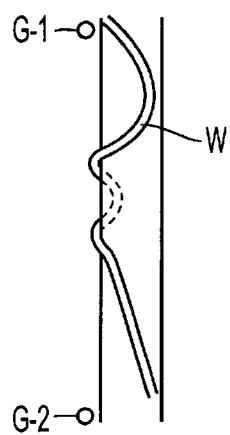
Figure 2C:
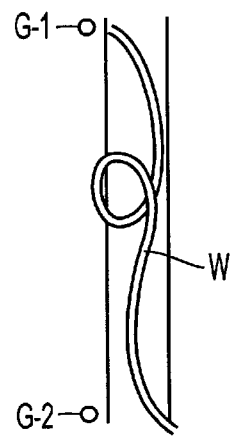

In table 2, a connector connected to a first end of one electric wire is denoted by "end A", and a connector connected with the other end thereof is denoted by "end B". The numbers 1, 2, . . . shown in the column under the heading "end A", and in the column under the heading "end B" correspond to connectors shown in FIG. 4. The "length after connector correction" is the cutting length determined by subtracting the correction length (10 mm) due to the end of the electric wire to be inserted into a cavity of a connector housing, from the approximate length indicated on the drawing (i.e. the length to the end of the connector housing). The "length after tuning" means the cutting length determined by subtracting the correction due to curving at the jig (i.e. ΔZ which FIG. 2 refers to as the "tuning length") from the "length after connector correction".

Figure 12:
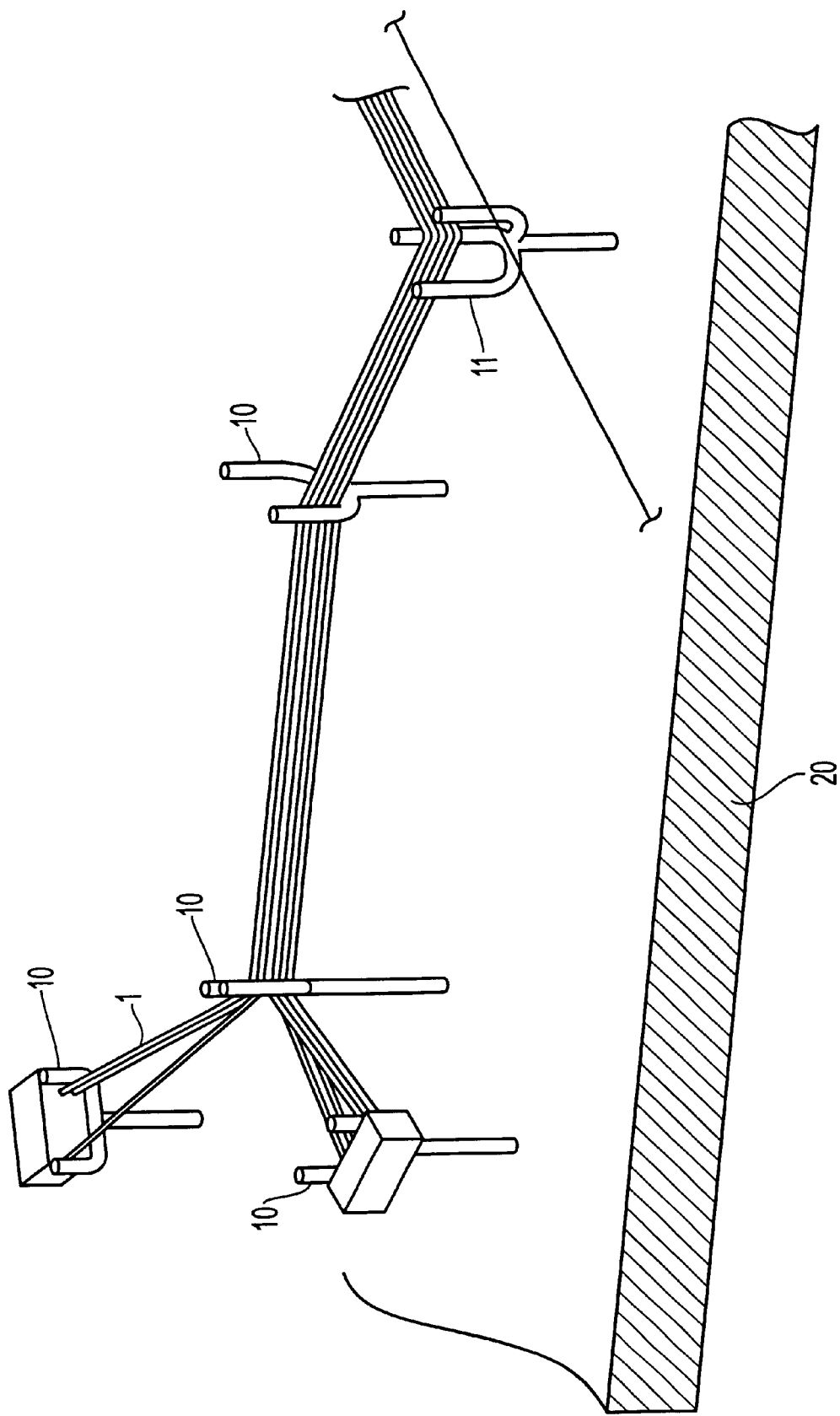
FIG. 12 is a perspective view showing electric wires cut to have lengths determined by a method of the invention, and wired on a table for assembling wire harnesses.
Figure 13:
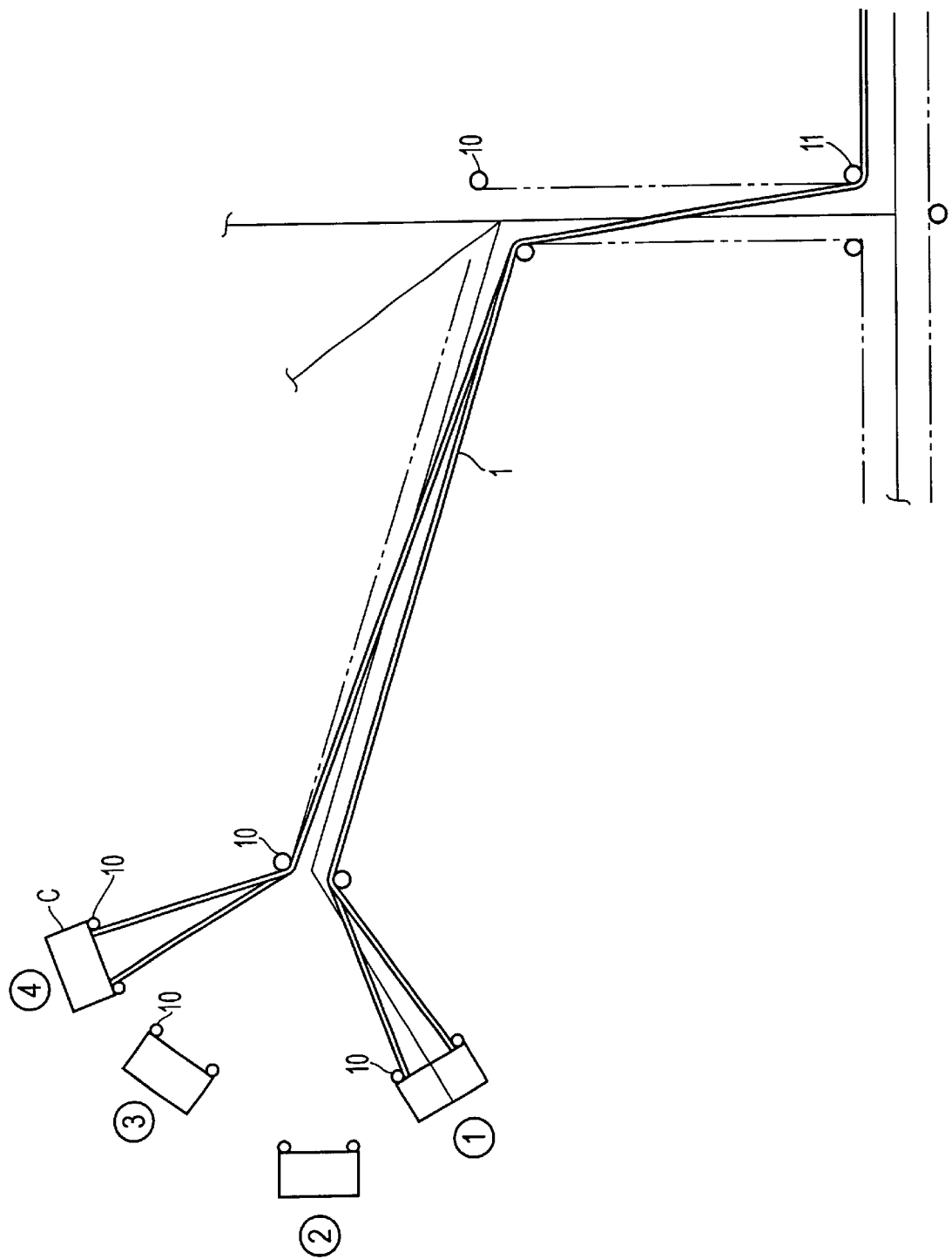
FIG. 13 is a plan view showing the electric wires of FIG. 12.

Each electric wire constituting a circuit is cut based on the electric wire cutting length determined by steps #1–#5. Similarly to the conventional method, a terminal is crimped onto the termination portion of each of the cut electric wires by a terminal-crimping device. Then, an operator sub-assembles (temporarily binds) the electric wires and installs a connector housing on the termination portion of each electric wire for which it is required. Then, as shown in FIGS. 12 and 13, the operator wires the sub-assembled bundle of the electric wires over a wire harness-assembling table 20. At this time, the operator passes the electric wires through the jigs 10, 11, and 12 erected on the wire harness-assembling table 20 by curving them, or by laying the wires straight.

In the case of an electric wire 1 which curves at the jigs 10, 11, and 12, the electric wire 1 is positioned starting at an inner part of the harness. When an electric wire close to the inner peripheral side of the jig is wired it remains slightly loose, because it has a certain length excess. As further wires are gradually added, however, the length excess becomes gradually smaller as each wire approaches closer to the center of the jig. When there are one or more electric wires which do not reach the connector housing, they are re-cut with the length shortfall corrected, and a wire harness is again prepared as an experiment.

As described above, the first and second corrections are made to the approximate length shown on the drawing, and the wire tuning length is subtracted. Therefore, it is possible to minimise the length of the wire extending between the jigs 10 and 11, 11 and 12, and 12 and 10.

Figure 14A:
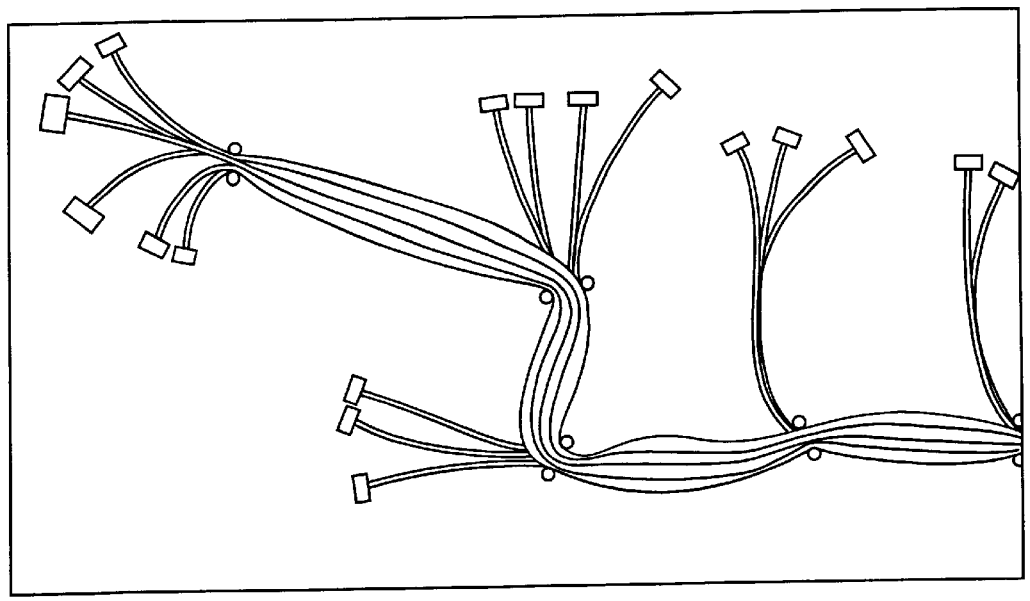
FIG. 14A is plan view showing electric wires wired by a method.
Figure 14B:
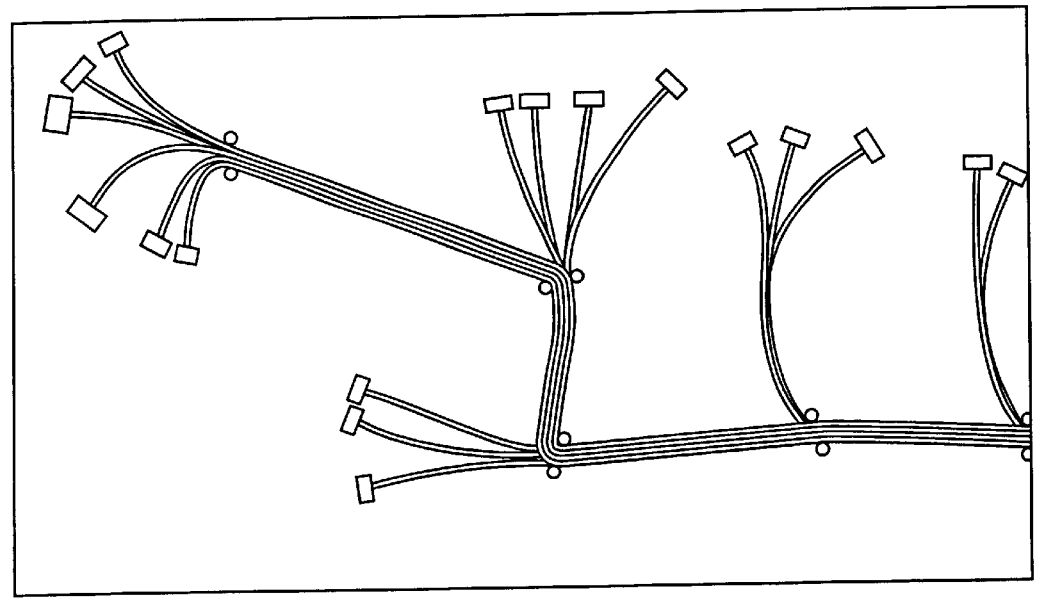
FIG. 14B is plan view showing electric wires wired by a method according to the invention.

Consequently, as shown in FIG. 14B, it is possible to prevent excess electric wire from bulging between the jigs.

FIG. 14A shows a wire harness produced in a conventional way, in which the wire length tuning has not been performed. FIG. 14B shows a harness made using the present invention, in which the wire length tuning has been performed. FIGS. 14A and 14B show wire harnesses wired over a wire harness-assembling table. As is apparent from FIGS. 14A and 14B, in the case shown in FIG. 14A, the electric wires are loose at a plurality of positions because the wire length tuning was not performed, whereas in the case shown in FIG. 14B, in the corresponding positions the electric wires are not loose because the wire length tuning has been performed. Thus, in the case shown in FIG. 14B, only one experimental construction of a wire harness was required.

As is apparent from the foregoing description, according to the present invention, an appropriate length of an electric wire may be determined by performing the wire length tuning, and the length of an electric wire is optimised so that it is prevented from being longer than a predetermined length. Thus, it is possible to prevent the electric wire from being longer than the predetermined length, as in the prior art. Further, corrections are made depending on the shape of each jig and the diameter of each electric wire. Thus, each electric wire is allowed to have an appropriate length irrespective of the number of jigs. Generally, the electric wire of each circuit constituting a wire harness passes in a curve through a jig three to seven times. Suitable corrections are made to the length of each electric wire for each jig at which the wire curves. Therefore, the invention provides a wire harness having electric wires of appropriate length.

Even though each electric wire will still, in practice, have a longer length than is required, the excess is so small that it is unnecessary to coil it before binding it with a binding tape, and it is possible to wind the binding tape round a plurality of electric wires with the overly long electric wires only slightly loose.

As described above, according to the invention, the cutting length of the electric wire is determined initially. Thus, a wire harness can be constructed only once on an experimental basis, whereas according to the wire length tuning method, the wire harness must be constructed three times or more as an experiment. Thus, the time required until true manufacture can begin is shortened. Further, compared with a method of producing a wire harness without performing the wire length tuning, the method of the invention reduces the number of processing stages and time and labor. Further, no skilled operator is required to manufacture the wire harness. Furthermore, since the electric wire is not cut to be longer than is required, its cost is low, and the cars in which the harness is used are lighter.

The method of the invention could be embodied in a program stored in a record medium such as a floppy disk or CD-ROM. Operation of the method could be performed by a system utilizing the program stored in the record medium.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of determining appropriate lengths of a plurality of wires to be used to construct a wire harness by a manufacturing process, comprising:

(1) cutting electric wires of said appropriate lengths, (2) temporarily binding groups of said electric wires together, (3) passing the groups through at least one jig on a wire harness assembly (4) s he groups to each other by winding adhesive tape around the groups, (5) inserting ends of a plurality of the wires into respective cavities in connector housings, (6) using an approximate length for each wire, each said approximate length being based on a respective path through the wire harness that passes through each said jig; and (7) determining each of the appropriate lengths by correcting each said approximate length to take into account the following correction factors:

(a) bending of each of the wires as the wires passes through said at least one jig, correction factor (a) takes into account the difference between (i) a bent length of a wire path, at the center of the wire harness in section, that bends to pass through the center of the distance between fingers of the jig and (ii) a curved length of a wire path, at the center of the wire harness in section, that curves to pass between the center of the distance between the fingers of the jig and an inner peripheral surface of a finger at the side in which the wire is curved, and when one of the wires is intended to be inserted into a cavity in one of the connector housings, (b) the extent to which the wire is intended to extend into the said one of the connector housings, and (c) a distance of the cavity into which the wire is intended to be inserted from a position of said one of the connector housings that is central with respect to the wire harness.

2. A method according to claim 1 in which among said jigs are jigs having two fingers for retaining wires, jigs having three fingers for retaining wires and jigs having four fingers for retaining wires, said fingers extending perpendicularly to the plane of the wire harness assembly platform, and correction (a) corrects the length of the wire by an amount $\Delta L$ given by, $$\Delta L = \frac{1}{2}\sum_{m=1}^{k} W_{2,m} + \sum_{p=1}^{h} W_{3,p} + \sum_{n=1}^{i} W_{4,n} - \frac{1}{4} B\, coe(r) 2\pi$$

where
- k is the number of 2-finger jigs through which the wire passes,
- h is the number of 3-finger jigs through which the wire passes,
- i is the number of 4-finger jigs through which the wire passes,
- m, n and p are integer variables,
- $W_{2,m}$ is the distance between the two fingers of the m-th 2-finger jig,
- $W_{3,p}$ is the distance between two fingers of the p-th 3 finger jig,
- $W_{4,n}$ is the distance between the two fingers of n-th 4-finger jig,
- r is the radius of the wire,
- coe(r) is the minimum radius of curvature of the wire depending on the radius r, and
- B is the total number of turns made by the wire due to the jigs.

3. A method according to claim 1, wherein the approximate length for each wire extends to a distal end of the connecting housing, and correction (b) subtracts the distance between the distal end of the connector housing and the intended position of the end of the wire within the connecting housing, and adds a predetermined length tolerance value.

4. A method according to claim 1, wherein the approximate length for each wire to a respective connector extends to a centre point of the entry face of the connector housing in an extension direction, and said correction (c) adds a value depending upon the distance of the cavity for the wire from said centre point.

5. A method according to claim 5 in which said value of the correction (c) is $L_1$ given by $$L_1 = \sqrt{(X-X_1)^2 + (Y-Y_1)^2}$$

where
- X and Y are the coordinates of said central point measured along respective x- and y-coordinate axes which are perpendicular to the extension direction and to each other, and
- $X_1$ and $Y_1$ are the coordinates of the centre of the cavity measured along said respective x- and y-coordinate axes, except that, if $L_1$ is less than a predetermined value, no correction (c) is made.

6. A method of determining appropriate lengths of a plurality of wires to be used to construct a wire harness by a manufacturing process, comprising:
(1) cutting electric wires of said appropriate lengths,
(2) temporarily binding groups of said electric wires together,
(3) passing the groups through at least one jig on a wire harness assembly platform,
(4) binding the groups to each other by winding adhesive tape around the groups,
(5) inserting ends of a plurality of the wires into respective cavities in connector housings,
(6) using an approximate length for each wire, each said approximate length being based on a respective path through the wire harness that passes through each said jig; and
(7) determining each of the appropriate lengths by correcting each said approximate length to take into account the following correction factor:

bending of each of the wires as the wires passes through said at least one jig, the correction factor takes into account the difference between (i) a bent length of a wire path, at the center of the wire harness in section, that bends to pass through the center of the distance between fingers of the jig and (ii) a curved length of a wire path, at the center of the wire harness in section, that curves to pass between the center of the distance between the fingers of the jig and an inner peripheral surface of a finger at the side in which the wire is curved, and which among said jigs are jigs having two fingers for retaining wires, jigs having three fingers for retaining wires and jigs having four fingers for retaining wires, said fingers extending perpendicularly to the plane of the wire harness assembly platform, and correction (a) corrects the length of the wire by an amount ΔL given by, $$\Delta L = \frac{1}{2}\sum_{m=1}^{k} W_{2,m} + \sum_{p=1}^{h} W_{3,p} + \sum_{n=1}^{i} W_{4,n} - \frac{1}{4} B\, coe(r) 2\pi$$

where
- k is the number of 2-finger jigs through which the wire passes,
- h is the number of 3-finger jigs through which the wire passes,
- i is the number of 4-finger jigs through which the wire passes,
- m, n and p are integer variables,
- $W_{2,m}$ is the distance between the two fingers of the m-th 2-finger jig,
- $W_{3,p}$ is the distance between two fingers of the p-th 3 finger jig,
- $W_{4,n}$ is the distance between the two fingers of n-th 4-finger jig,
- r is the radius of the wire,
- coe(r) is the minimum radius of curvature of the wire depending on the radius r, and
- B is the total number of turns made by the wire due to the jigs.

7. A method of determining appropriate lengths of a plurality of wires to be used to construct a wire harness by a manufacturing process, comprising:
(1) cutting electric wires of said appropriate lengths,
(2) temporarily binding groups of said electric wires together,
(3) passing the groups through at least one jig on a wire harness assembly platform,
(4) binding the groups to each other by winding adhesive tape around the groups,
(5) inserting ends of a plurality of the wires into respective cavities in connector housings,
(6) using an approximate length for each wire, each said approximate length being based on a respective path through the wire harness that passes through each said jig; and
(7) determining each of the appropriate lengths by correcting each said approximate length to take into account the following correction factors when one of the wires is intended to be inserted into a cavity in one of the connector housings:
  (a) the extent to which the wire is intended to extend into the said one of the connector housings, and
  (b) a distance of the cavity into which the wire is intended to be inserted from a position of said one of the connector housings that is central with respect to the wire harness,
wherein the approximate length for each wire to a respective connector extends to a centre point of the entry face of the connector housing in an extension direction, and said correction (b) adds a value depending upon the distance of the cavity for the wire from said centre point, and
wherein said value of the correction (b) is $L_1$ given by $$L_1 = \sqrt{(X-X_1)^2 + (Y-Y_1)^2}$$

where

X and Y are the coordinates of said central point measured along respective x- and y-coordinate axes which are perpendicular to the extension direction and to each other, and $X_1$ and $Y_1$ are the coordinates of the centre of the cavity measured along said respective x- and y-coordinate axes, except that, if $L_1$ is less than a predetermined value, no correction (b) is made.

* * * * *